F. S. RECE.
POULTRY KILLER.
APPLICATION FILED APR. 1, 1920.

1,356,941.

Patented Oct. 26, 1920.
2 SHEETS—SHEET 1.

Frank S. Rece,
INVENTOR.

BY Lacey & Lacey
ATTORNEYS

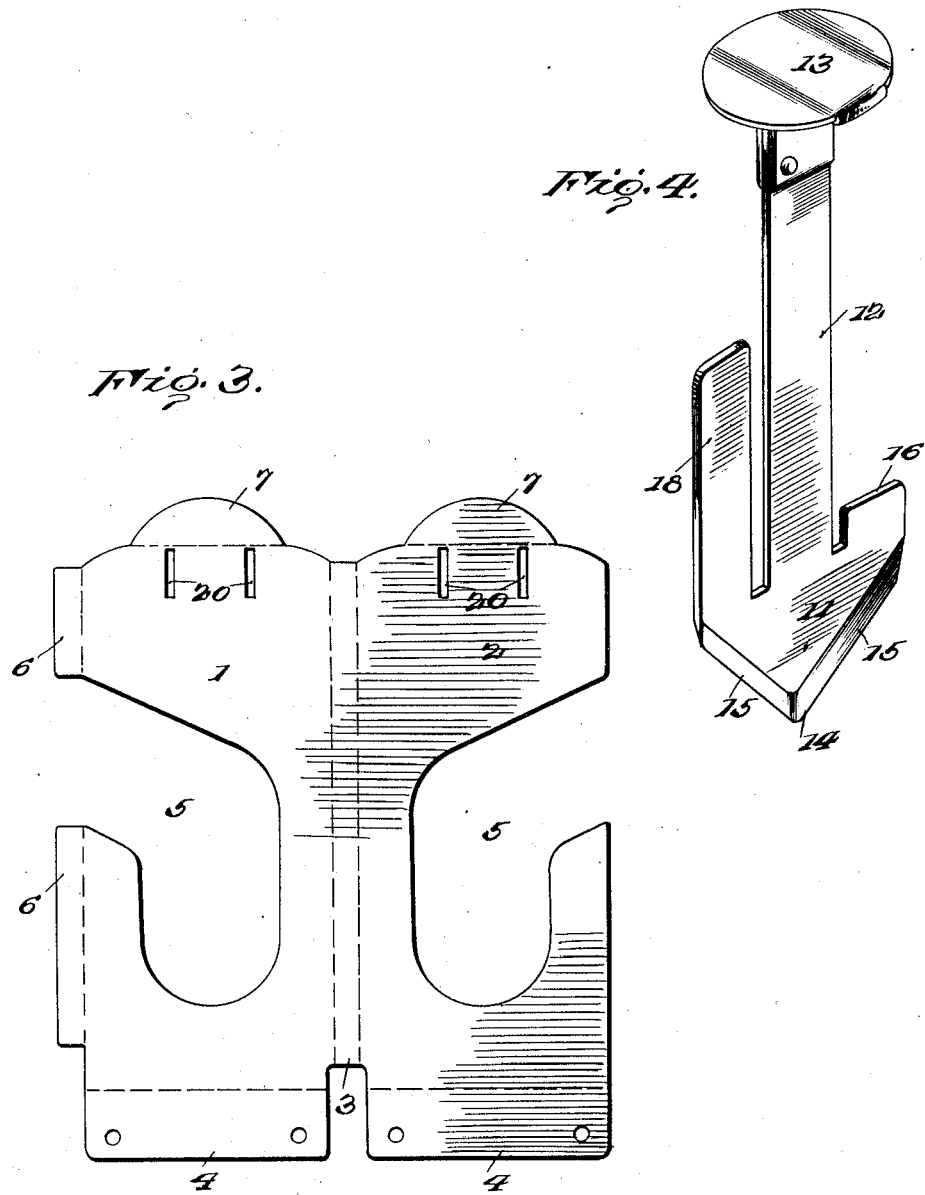

UNITED STATES PATENT OFFICE.

FRANK S. RECE, OF DALLAS, TEXAS, ASSIGNOR OF ONE-HALF TO ALBERT P. CUNNINGHAM, OF DALLAS, TEXAS.

POULTRY-KILLER.

1,356,941. Specification of Letters Patent. Patented Oct. 26, 1920.

Application filed April 1, 1920. Serial No. 370,590.

*To all whom it may concern:*

Be it known that I, FRANK S. RECE, a citizen of the United States, residing at Dallas, in the county of Dallas and State of Texas, have invented certain new and useful Improvements in Poultry-Killers, of which the following is a specification.

This invention is a device for killing poultry and has for its object the provision of a very simple and inexpensive article which may be easily operated by a timid or unskilled person to kill poultry without decapitation or, if desired, to entirely behead the fowl. The invention is illustrated in the accompanying drawings and will be hereinafter fully described, the novel features being subsequently particularly pointed out in the appended claims.

In the drawings—

Fig. 3 is a plan view of the blank from which the frame is formed;

Fig. 4 is a detail perspective view of the cutter.

Figure 1:
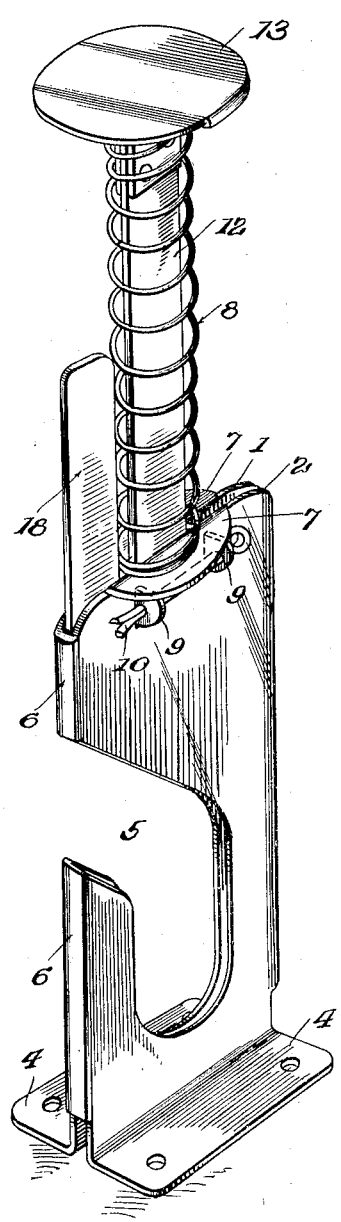
Figure 1 is a perspective view of a device embodying my present improvements.
Figure 2:
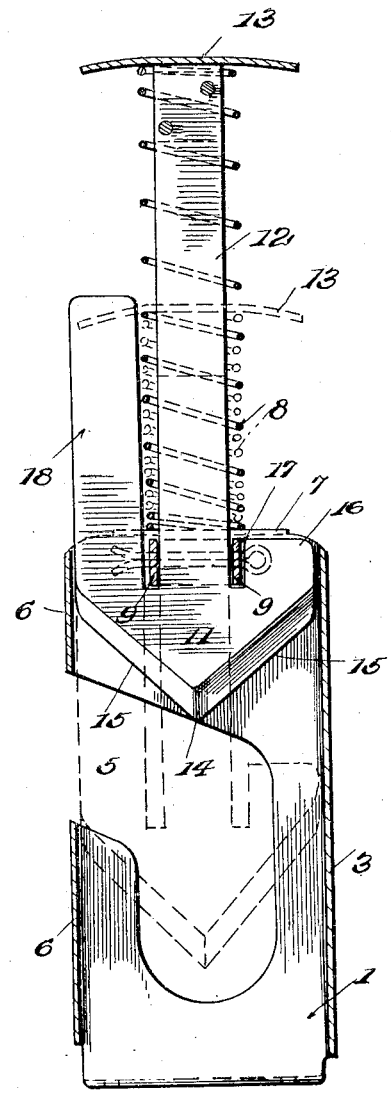
Fig. 2 is a vertical longitudinal section of the same.

In carrying out my invention, I employ a frame which may be conveniently and economically produced from a blank of sheet metal, such as shown in Fig. 3, bent to provide parallel leaves 1 and 2 connected at their back edges by a web 3 and provided at their lower ends with lateral flanges 4 through which fasteners may be inserted to secure the device upon a fixed support. Openings or slots 5 are formed in the leaves 1 and 2 to open through the front edges thereof and the front edges of the leaves are bridged above and below the said openings or slots by lips 6 which are formed on the front edge of one leaf and bent over to rest upon the front edge of the other leaf, as clearly shown in Fig. 1. It will be noted that the slots or openings 5 are of the bayonet slot form, having a vertical portion which is closed at its lower end and forms a rest for the neck of the fowl which will hold the fowl in such position that its head cannot twist out of the seat or slot and the killing or decapitation will be accomplished painlessly and quickly. The upper branch of the bayonet slot 5 inclines downwardly from the front edges of the frame so that the insertion of the neck of the fowl may be accomplished readily and it will not be necessary to follow a path having an abrupt turn which would make it more difficult to properly bring the neck of the fowl into the seat formed by the bottom of the slot. At the upper ends of the leaves 1 and 2 are lateral lips or flanges 7 which form seats or abutments for a coiled spring 8 and immediately below the said lips or abutments, a clip 9 has its end members inserted through slots 20 in the leaves and retained therein by a cotter pin or similar device 10. The cutter consists of a blade 11 and a shank 12 rising from the blade and preferably formed integral therewith, the spring 8 being coiled around the shank between the abutments 7 and a handle 13 at the upper end of the shank. The edges of the shank engage the inner opposed faces of the clip 9 and are guided thereby. The blade 11 is shaped to present a central point 14 and its edge diverges upwardly from the said point, as shown at 15, while at the upper end of the head or blade, at the rear thereof, is a short upwardly extending tongue 16 which plays between the web 3 and the rear end of the clip 9 so that it aids in guiding the blade in the operation of the device. Moreover, this tongue 16 is spaced from the adjacent edge of the shank 12 so that a notch or recess 17 is formed which engages the end of the clip 9 and consequently said clip serves as a stop to limit the upward movement of the blade. A long tongue 18 rises from the blade at the front edge thereof and this tongue engages the front end of the clip 9 and the upper lip 6 so as to provide an additional guide for the cutter when the device is in use. The tongue 18 is spaced from the shank 12 so as to accommodate the forward end of the clip 9 which serves as a stop to limit the upward movement of the cutter and the coils of the spring 8 are accommodated in the space between the shank and the said tongue. When the cutter is lowered, as indicated in dotted lines in Fig. 2, the tongue 18 will bridge the open ends of the slot 5 so that the cutter will be effectually guided and will be positively prevented from deviating from its desired straight path while at the same time friction between the parts which would tend to retard the operation and make the device hard to manipulate is practically eliminated.

In use, the neck of the fowl is seated in the lower end of the bayonet slot 5, as before stated, and the cutter is then caused to penetrate the neck of a fowl by a blow delivered upon the handle 13. It will be readily noted that the parts are of such relative dimensions that when the cutter is in its highest position the point 14 thereof is immediately at the upper edge of the neck-receiving slot so that a light tap upon the handle 13 will cause the said point to enter the neck of the fowl and sever the spinal cord so that the fowl will be instantly killed and bleeding or draining of the neck will be permitted. This operation will commend the device to poultry dealers who prefer the head of the fowl to be left thereon while domestic users who desire the head removed may accomplish that end by delivering a hard blow upon the handle 13 whereupon the blade will be caused to move entirely across the neck of the fowl and behead the same. Upon release of the pressure upon the handle 13, the spring 8 will at once expand and raise the cutter to the position shown in full lines in Fig. 2 so that the killed fowl may be easily removed and another live fowl brought into position to be killed. While the slot 5 will facilitate the engagement of the neck of the fowl in the seat therefor immediately below the point of the cutter, it will prevent the fowl coming in contact with the cutter while being brought into position in the seat and needless pain is, therefore, avoided.

My improved device is very simple in the construction and operation of its parts and may be produced at a very low cost. The several members of the device are so proportioned that it will occupy but a very small space and will be of light weight while it will prove very efficacious in use. The form of blade employed in my present device stabs the fowl and cuts in both directions from the center of the neck so that the neck will be severed with very little effort and a young child can, by the use of the device, decapitate a large turkey or goose. The particular form of the neck-receiving slot in the present device permits me to reduce the height of the frame and thereby reduce the cost of manufacture through a saving of material and also improve the appearance of the device.

Having thus described the invention, what is claimed as new is:

1. A device for the purpose set forth comprising a frame consisting of parallel leaves having a neck-receiving opening through their front edges and having bridging members extending across their edges, said neck-receiving opening having a vertical portion provided with a closed end forming a seat for the neck of the fowl, an upper branch inclined downwardly from the front of the frame to said seat forming branch, a cutter mounted for vertical reciprocation between said leaves and having its cutting edge provided with a central point and diverging upwardly from said point, means for guiding the cutter, and yieldable means for holding the cutter normally raised above the neck-receiving opening.

2. A device for the purpose set forth comprising a frame consisting of parallel spaced leaves, members bridging the front and rear edges of said leaves, said leaves being provided with a neck-receiving opening, a clip fitted through the leaves at the upper end thereof, a cutter mounted between the leaves and consisting of a blade adapted to abut the lower edge of said clip, and a shank rising from the blade through said clip and guided by the same and tongues rising from the blade to play, respectively, between the ends of the clip and the front and rear bridging members, and yieldable means for normally holding the cutter in a raised position.

3. A device for the purpose set forth comprising a frame consisting of spaced parallel leaves provided with a neck-receiving opening extending through the front edge of the frame, members bridging the leaves at the rear thereof and at the front thereof above and below the neck-receiving opening, a clip fitted through the leaves at the upper end thereof, abutments on the upper ends of the leaves, a cutter comprising a blade disposed between the leaves, a shank rising from the blade through the clip and guided by the same, a handle on the upper end of the shank, and tongues rising from the blade in front and in rear of the shank and spaced therefrom to form recesses engaging the ends of the said clip, the front tongue being adapted to bridge the neck-receiving opening when the cutter is lowered, and a spring coiled around the shank between the abutments on the leaves and the handle at the upper end of the shank.

In testimony whereof I affix my signature.

FRANK S. RECE. [L. S.]